United States Patent
Tran et al.

[11] Patent Number: 6,115,521
[45] Date of Patent: Sep. 5, 2000

[54] FIBER/WAVEGUIDE-MIRROR-LENS ALIGNMENT DEVICE

[75] Inventors: Dean Tran, Westminster; Eric R. Anderson, Redondo Beach; Ronald L. Strijek, Vista; Edward A. Rezek, Torrance, all of Calif.

[73] Assignee: TRW Inc., Redondo Beach, Calif.

[21] Appl. No.: 09/074,187

[22] Filed: May 7, 1998

[51] Int. Cl.[7] .................................................. G02B 6/32
[52] U.S. Cl. .............................................. 385/52; 385/33
[58] Field of Search ................................ 385/33, 47–49, 385/52

[56] References Cited

U.S. PATENT DOCUMENTS

| | | | |
|---|---|---|---|
| 4,433,898 | 2/1984 | Nasiri | 385/91 |
| 4,653,847 | 3/1987 | Berg et al. | 385/79 |
| 4,875,750 | 10/1989 | Spaeth et al. | 385/35 |
| 5,071,213 | 12/1991 | Chan | 385/52 |
| 5,073,003 | 12/1991 | Clark | 385/33 |
| 5,247,597 | 9/1993 | Blacha et al. | 385/88 |
| 5,343,546 | 8/1994 | Cronin et al. | 385/52 |
| 5,346,583 | 9/1994 | Basavanhally | 216/26 |
| 5,600,741 | 2/1997 | Hauer et al. | 385/35 |
| 5,627,931 | 5/1997 | Ackley et al. | 385/88 |
| 5,774,609 | 6/1998 | Bäcklin et al. | 385/49 |
| 5,898,803 | 4/1999 | Meuller-Fiedler et al. | 385/36 |
| 5,987,202 | 11/1999 | Gruenwald et al. | 385/49 |

OTHER PUBLICATIONS

Y. Oikawa, H. Kuwatsuka, T. Tamamoto, T. Ihara, H. Hamano, and T. Minami "Packaging Technology for a 10–Gb/s Photoreceiver Module", Journal of Lightwave Technology, vol. 12, No. 2, Feb. 1992, pp. 343–352.

Primary Examiner—John D. Lee
Assistant Examiner—Michelle R. Connelly-Cushwa
Attorney, Agent, or Firm—Michael S. Yatsko

[57] ABSTRACT

The invention relates to an optical integrated alignment device for accurately aligning optical fiber and waveguides to efficiently couple energy between optical devices. This is accomplished by using the anisotropic etch characteristics of III-V semiconductor materials. One orthogonal etch direction serves to provide a channel for precise fiber-positioning; the other direction, which is also orthogonal provides a reflecting surface for directing the optical energy between optical devices; and finally, a non-selective etch to form a micro-optical lens to focus optical energy to an optical device.

13 Claims, 7 Drawing Sheets

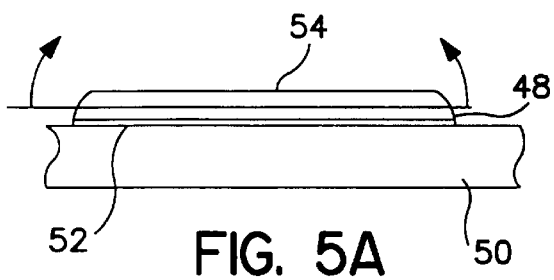 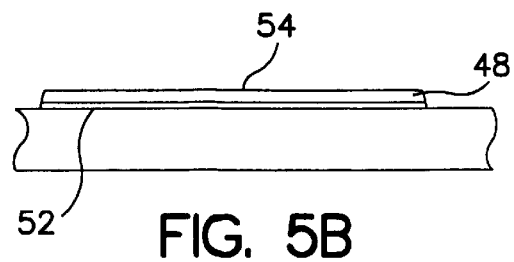
FIG. 5A    FIG. 5B
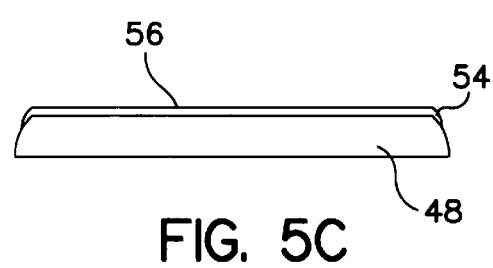 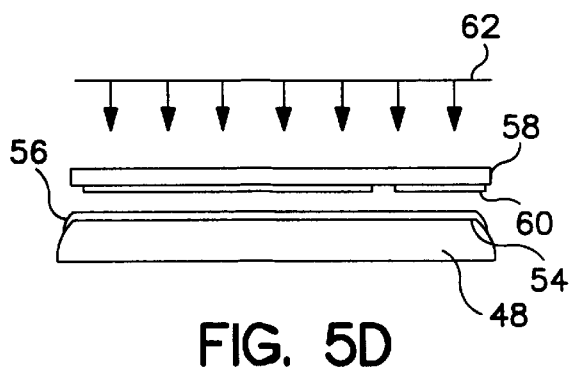
FIG. 5C    FIG. 5D
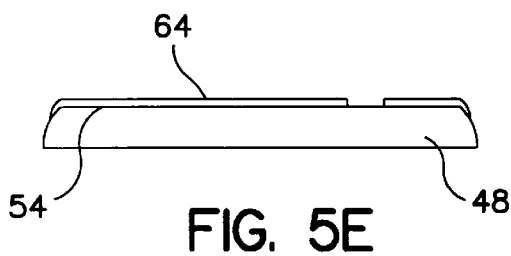 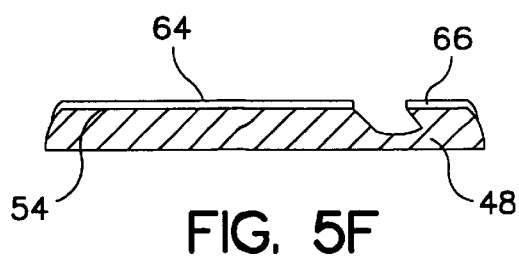
FIG. 5E    FIG. 5F
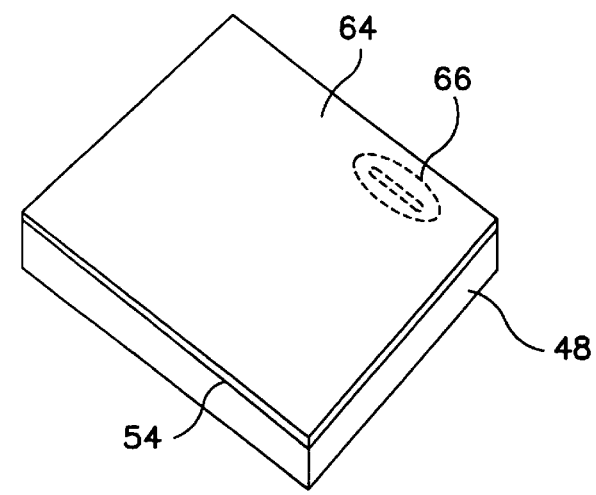
FIG. 5G

FIBER/WAVEGUIDE-MIRROR-LENS ALIGNMENT DEVICE

BACKGROUND OF THE INVENTION

1. Field of the Invention

The present invention relates to a monolithically integrated alignment device for coupling optical energy between optical devices and a method for producing the same by using the anisotropic etch characteristics of III-V semiconductors where one orthogonal etch direction provides a natural channel for fiber positioning, the other orthogonal etch direction provides a reflecting surface for the redirection of optical energy between a fiber or waveguide and optical devices, and a non-selective etch provides a lens to focus optical energy on an optical device.

2. Description of the Prior Art

Compact and simple optical coupling systems for micro-optical devices are essential in optical communication systems. In addition, simplified assembly processes in packaging micro-optical coupling systems are very important in manufacturing low cost and reliable systems. An increasingly popular method for the coupling of optical energy between optical devices and systems is through the use of fiber and micro-optical lenses. Fiber provides an efficient transfer medium between optical devices by providing improvements in coupling efficiency and communication lag. Micro-optical lenses provide additional coupling efficiency by focusing divergent optical energy output from an optical fiber end. Present optical coupling systems use a variety of coupling schemes to obtain efficient coupling between micro-optical devices.

The publication "Packaging Technology for a 10-Gb/a Photoreceiver Module", by Oikawa et al., Journal of Lightwave Technology Vol. 12 No. 2 pp.343–352, February 1994 discloses an optical coupling system containing a slant-ended fiber 10 secured in a fiber ferrule 12 where the fiber ferrule 12 is welded to a side wall 14 of a flat package 16 and a microlens 18 is monolithically fabricated on a photodiode 20 where the photodiode 20 is flip-chip bonded to the flat package 16, as illustrated in FIG. 1. An optical signal 22 enters horizontally and is reflected vertically at the fiber's 10 slant-edge. The microlens 18 then focuses the optical signal 22 on the photodiode's 20 photosensitive area.

In the Oikawa publication, maintaining alignment between the fiber and the photodiode chip is essential for optimal coupling of the optical signal. Misalignment can occur as a result of mechanical stress to the fiber ferrule or thermal fluctuations of the entire system. In an attempt to overcome these factors, complex assembly and fabrication techniques are used. The fiber attachment is a complex ferrule attachment which seeks to optimize the mechanical strength of the attachment and therefore minimize the effects of fiber displacement. Because the photodiode chip is flip-chip bonded on the flat package a complex bonding machine is required for high-precision alignment. Finally, in order to provide a high optical coupling efficiency wide misalignment tolerances must be built in to the photodiode chip during fabrication to compensate for both displacement by the fiber attachment and deformation by temperature fluctuation.

Disclosed in U.S. Pat. No. 5,346,583 is a monolithic coupling system for optical energy transfer between a microlens and a fiber, as illustrated in FIG. 2. The configuration disclosed in patent '583 contains at least one preshaped photoresist (PR) microlens 24 formed on a surface 33 of a substrate 34 by standard photolithography steps and on an opposing surface 31 of the substrate 34 an optical fiber guide 26 is formed through standard photolithography steps. The fiber guide 26 is used to mount an optical fiber 28 such that the central axis 30 of the optical fiber 28 is substantially coincident with the central axis 32 of the PR microlens 24. While the proximity of the fiber 28 to the microlens 24 allows for efficient coupling of optical energy between the fiber 28 and an optical device, there are some significant disadvantages. First, the system is not very compact because of the orientation of the fiber 28 to the surface 31 of the substrate 34. More importantly, the PR microlens 24 cannot withstand variable temperature cycles and long-term reliability of the system would be an issue.

In many cases external lenses are used to couple optical energy between optical fibers or waveguides and optical devices. Examples of such coupling techniques are disclosed in U.S. Pat. Nos. 5,247,597; 4,653,847; 4,433,898; 4,875,750; and 5,343,546. Using external microlenses makes coupling extremely complex and in most cases unreliable.

As discussed, present optical coupling systems use a variety of coupling schemes to obtain efficient coupling between micro-optical devices. However, these schemes use many components, require a complicated assembly process, and are not compact. In addition, these components are typically made of different materials and have different thermal expansion coefficients. These differences can cause optical misalignment during temperature changes, which are common in military and space applications. Furthermore, when using discrete bulk optical components, the complexity of the assembly process is increased because there are more individual components to align. The greater the complexity the more assembly costs are increased and reliability decreased.

Based on techniques known in the art for optoelectronic coupling schemes, a monolithic alignment device for coupling optical energy between a fiber or a waveguide and an optical device is highly desirable.

SUMMARY OF THE INVENTION

It is an aspect of the present invention to provide an alignment device for the coupling of light between optical devices which includes a substrate wafer having a first crystal plane, a second crystal plane, a third crystal plane and a groove etched along the third crystal plane on a side of the substrate wafer intersecting the first crystal plane; a mirror etched on the first crystal plane of the substrate wafer; and a lens etched on the second crystal plane of the substrate wafer.

It is also an aspect of the present invention to provide a method for producing an alignment device for the coupling of light between optical devices. The method comprises the steps of providing a substrate wafer having a first surface, a second surface opposite the first surface, a first crystal plane, a second crystal plane, and a third crystal plane; lapping the entire first surface of the substrate wafer and polishing the entire first surface of the substrate wafer; coating a first layer of photoresist material over the entire first surface of the substrate wafer, coating a second layer of photoresist material over the entire first surface of the substrate wafer, and coating a third layer of photoresist material over the entire second surface of the substrate wafer; baking the first surface and the second surface of the substrate wafer; providing a first mask for the first surface of the substrate wafer, providing a second mask for the first surface of the substrate wafer, and a third mask for the second surface of the substrate wafer; selectively aligning the first mask to the first surface of the substrate wafer, selectively aligning the second mask to the first surface of the substrate wafer, and selectively aligning the third mask to the second surface of the substrate wafer; exposing the first surface of the substrate wafer coated with the first layer of photoresist material to a light source to form a first photoresist mask, exposing the first surface of the substrate wafer coated with the second layer of photoresist material to a light source to form a second photoresist mask, and exposing the second surface of the substrate wafer coated with the third layer of photoresist material to a light source to form a third photoresist mask; developing the first surface and the second opposing surface of the substrate wafer; etching the first opposing surface and the second surface of the substrate wafer; removing the first photoresist mask and cleaning the first surface of the substrate wafer, removing the second photoresist mask and cleaning the first surface of the substrate wafer, and removing the third photoresist mask and cleaning the second surface of the substrate wafer; and finally, metallizing the entire substrate wafer.

BRIEF DESCRIPTION OF THE DRAWINGS

Reference is now made to the following specification and attached drawings, wherein:

FIG. 5a is a side view illustration of the lapping and polishing of the substrate in accordance with the present invention;

FIG. 5b is a side view illustration of the substrate of FIG. 5a following the lapping and polishing steps;

FIG. 5c is a side view illustration of the substrate coated with a layer of photoresist material to begin the formation of a reflective surface through photolithography steps in accordance with the present invention;

FIG. 5d is a side view illustration of the substrate wafer which includes a layer of photoresist material on a surface of the substrate wafer and the layer of photoresist material is exposed by an ultra-violet light source through a mask to later form a reflective mirror in accordance with the present invention;

FIG. 5e is a side view illustration of the substrate wafer and a photoresist mask formed on the surface of the substrate following the exposure of the substrate wafer to the ultra-violet light source in accordance with the present invention;

FIG. 5f is a cross-sectional side view illustration of the preferentially etched surface of the substrate wafer where a flat reflective mirror is formed in accordance with the present invention;

FIG. 5g is a top view of the preferentially etched surface of the substrate wafer where a flat reflective mirror is formed in accordance with the present invention;

DETAILED DESCRIPTION OF THE INVENTION

Figure 1:
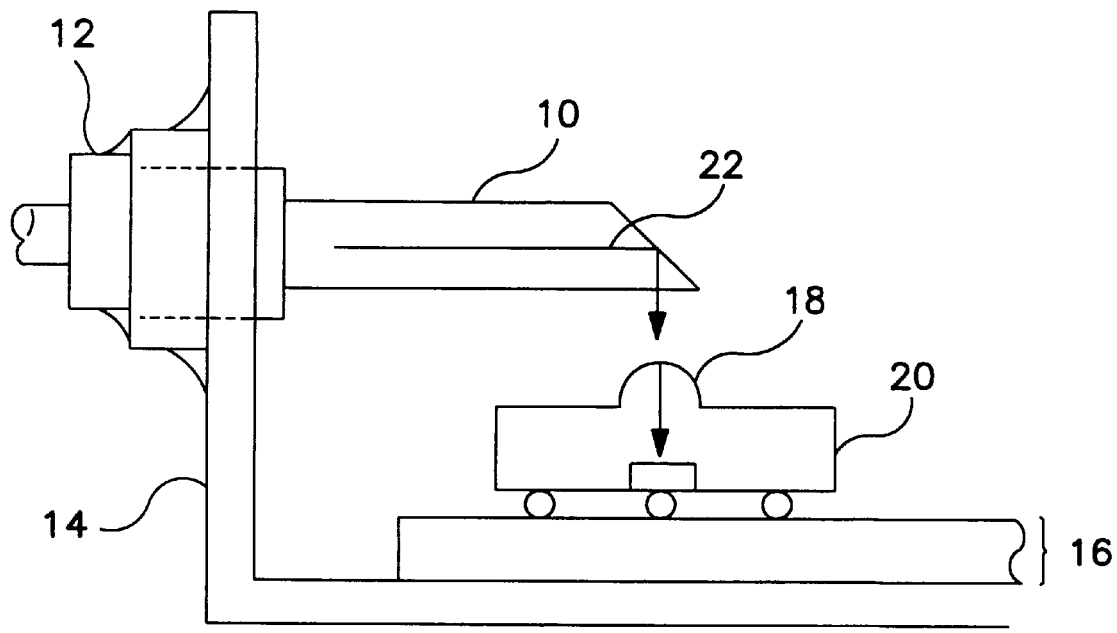
FIG. 1 is an illustration of a prior art optical coupling system which includes a mounted fiber assembly and a microlens monolithically integrated into a photodiode.
Figure 2:
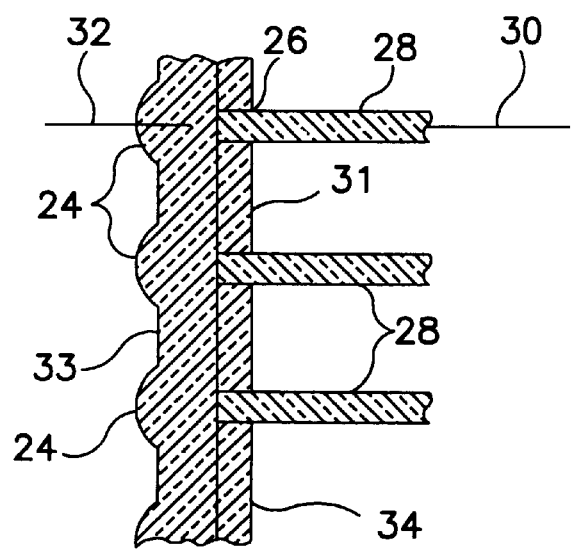
FIG. 2 is an illustration of another prior art optical coupling system which includes plurality of microlenses formed on a surface of a substrate and corresponding optical fiber guides formed on an opposing surface of the substrate.

Briefly, the present invention relates to a III-V semiconductor monolithic optical alignment device and a method for producing the same for coupling optical energy between optical devices. The alignment device, which is a monolithic assembly, can accurately align optical fibers, waveguides or modulators, redirect and focus optical energy to and from optical devices using a reflective surface and a micro-optical lens. The construction of the alignment device is accomplished by exploiting the anisotropic etch characteristics of III-V semiconductors. Etching in one direction creates a natural channel for precise fiber positioning; etching in another direction, which is orthogonal, creates a reflective surface at one end of the fiber channel for redirecting optical energy, and finally a micro-optical lens is non-selectively etched for focusing optical energy.

The ability to form a monolithic compact and simple optical coupling system for micro-optical devices has several advantages. First, because the alignment device can be made of the same semiconductor material as the device, there is better thermal expansion match between the microbench and the micro-optical device. Having the best thermal expansion match is important for stability where differences in thermal expansion coefficients can cause optical misalignments during temperature changes. Further, efficient coupling can be accomplished between a fiber, reflective surface, lens, and a device without the use of complex coupling and alignment schemes which require many components and complicated assembly processes. Other advantages include redirection and focusing of optical energy using one assembly, lower loss, lower spherical aberrations by using high index III-V semiconductor material for the lens construction, compact construction and reduced package profile, very accurate alignment of reflector to optical devices, decrease in the time required for alignment of the reflector to the micro-optical device by passive alignment, expandability to integrate multiple reflectors into one structure, and providing for more efficient packaging of optical electronics systems. Finally, very precise fabrication is possible by using standard photolithographic processes and wafer level fabrication can result in high volume manufacturing and high reproducibility.

As previously mentioned, the present invention relates to an improvement in the coupling of optical energy between optical devices. Present optical systems use a variety of coupling schemes which can be very complex and unreliable. In order to produce less complex, more efficient coupling between optical fibers, waveguides, or modulators and micro-optical devices, a reflective mirror, micro-optical lens, and fiber groove can be formed monolithically from the same semiconductor material to form an optical alignment device.

It should be understood by those of ordinary skill in the art that the principles of the present invention are applicable to many types of reflective mirrors, lenses, and micro-optical devices, such as flat mirrors, paraboloidal mirrors, aspherical lenses, semi-spherical lenses, semi-cylindrical lenses, gausian-cylindrical lenses, refractive lenses, binary lenses, Fresnell lenses, diffractive lenses, waveguide devices, diode laser devices, fiber optical devices, photodiode devices, and optical integrated circuits. The principles of the present invention are also applicable to many types of III-V semiconductors, such as indium phosphide (InP), gallium arsenide (GaAs), indium arsenide (InAs), and gallium phosphide (GaP).

Figure 3:
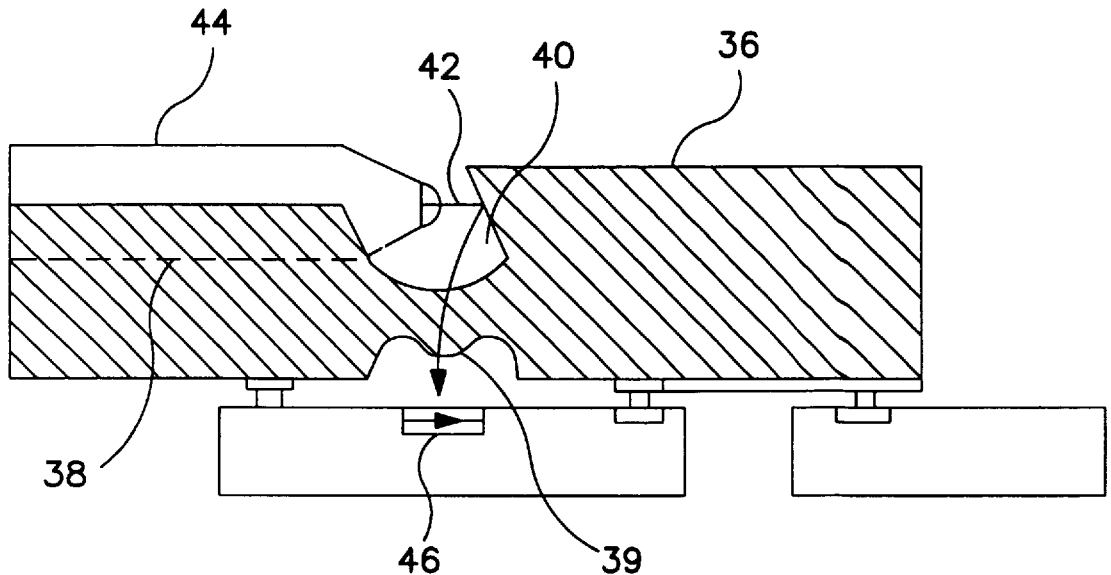
FIG. 3 is a side view illustration of the alignment device in accordance with the present invention.

The present invention relates to an optical alignment device and, more particularly, to an optical alignment device which includes a III-V semiconductor substrate 36, such as indium phosphide (InP), a fiber groove 38, a lens 39, and a reflective mirror 40, as illustrated in FIG. 3. An important aspect of the invention is the monolithic integration of the alignment device. The fiber groove 38 provides a natural channel for precise optical fiber positioning where optical energy 42 is emitted from an optical fiber 44 and redirected at the reflective mirror 40 and focused at the lens 39 for collection at an optical detector device 46. It should be understood that the principles of the present invention are also applicable for coupling optical energy from a waveguide to an optical device. It should further be understood that the reflective mirror can be used for redirecting and focusing the diverging output of optical energy from an emitter or waveguide, or it can be used for collecting the optical energy coming to the input of a waveguide or detector.

For illustration, a method for producing the monolithic optical alignment device is described and illustrated further in FIG. 4, FIGS. 5a through 5n, and FIGS. 6a through 6f with a substrate wafer 48, a groove 82, a lens 116, and a reflective mirror 66.

Figure 4:
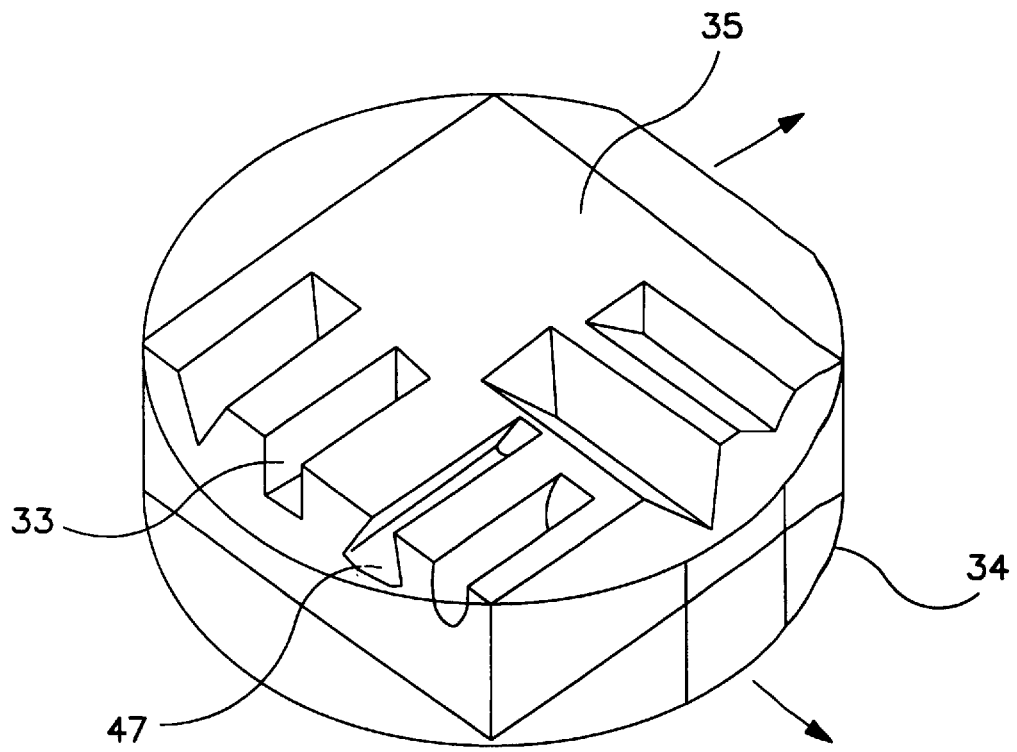
FIG. 4 is an illustration of the natural crystal planes of III-V semiconductor substrates.
Figure 5H:
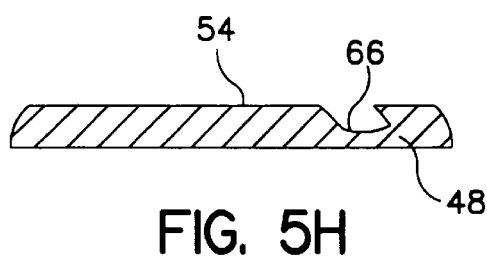
FIG. 5h is a cross-sectional side view illustration of the substrate of FIG. 5f where the photoresist has been removed from the surface of the substrate.
Figure 5I:
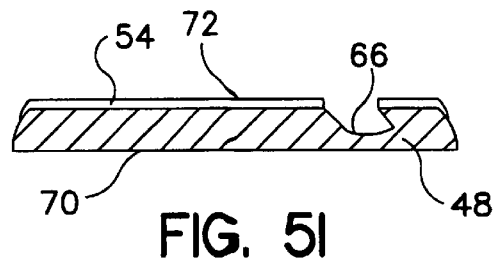
FIG. 5i is a cross-sectional side view illustration of the substrate wafer coated with a layer of photoresist material to begin the formation of a groove through photolithography steps on the surface opposite where the flat reflective mirror is formed in accordance with the present invention.
Figure 5J:
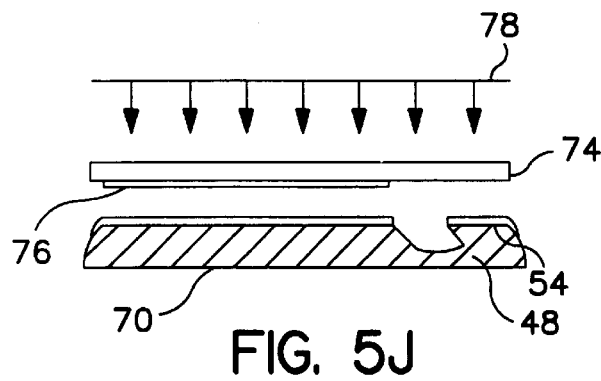
FIG. 5j is a side view illustration of the substrate wafer which includes a layer of photoresist material on a surface of the substrate wafer and the layer of photoresist material is exposed by an ultra-violet light source through a mask to later form a groove in accordance with the present invention.
Figure 5K:
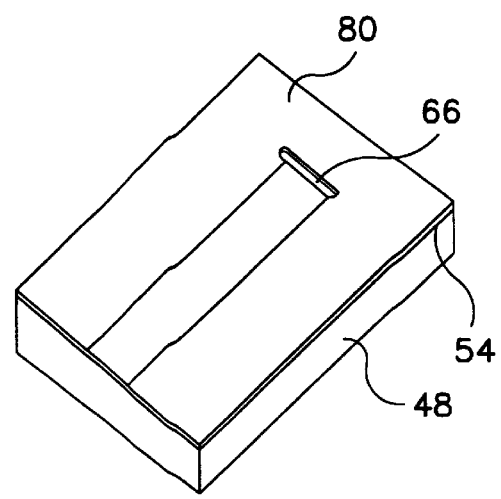
FIG. 5k is a top view illustration of the substrate wafer and a photoresist mask formed on the surface of the substrate following the exposure of the substrate wafer to the ultra-violet light source in accordance with the present invention.
Figure 5L:
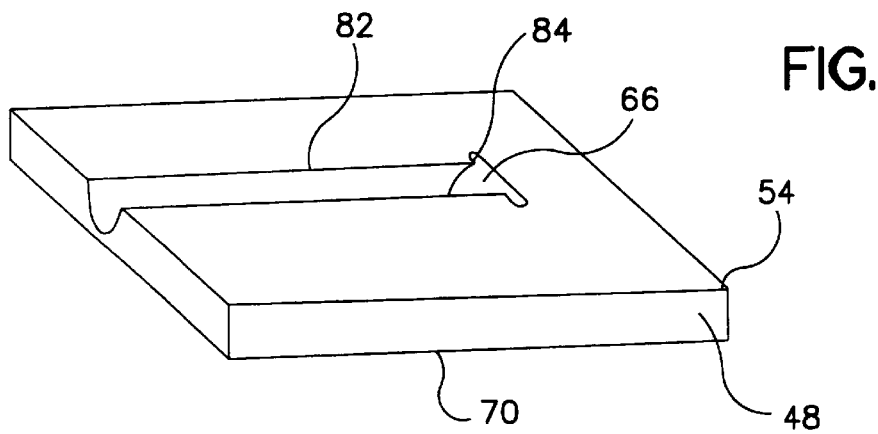
FIG. 5l is a top view illustration of the substrate wafer with an etched groove intersecting the plane of the etched flat reflective mirror in accordance with the present invention.
Figure 5M:
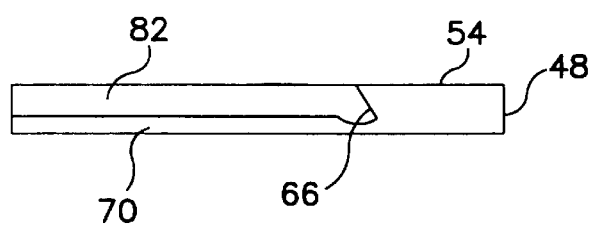
FIG. 5m is a side view illustration of the substrate wafer with an etched groove intersecting the plane of the etched flat reflective mirror in accordance with the present invention.
Figure 5N:
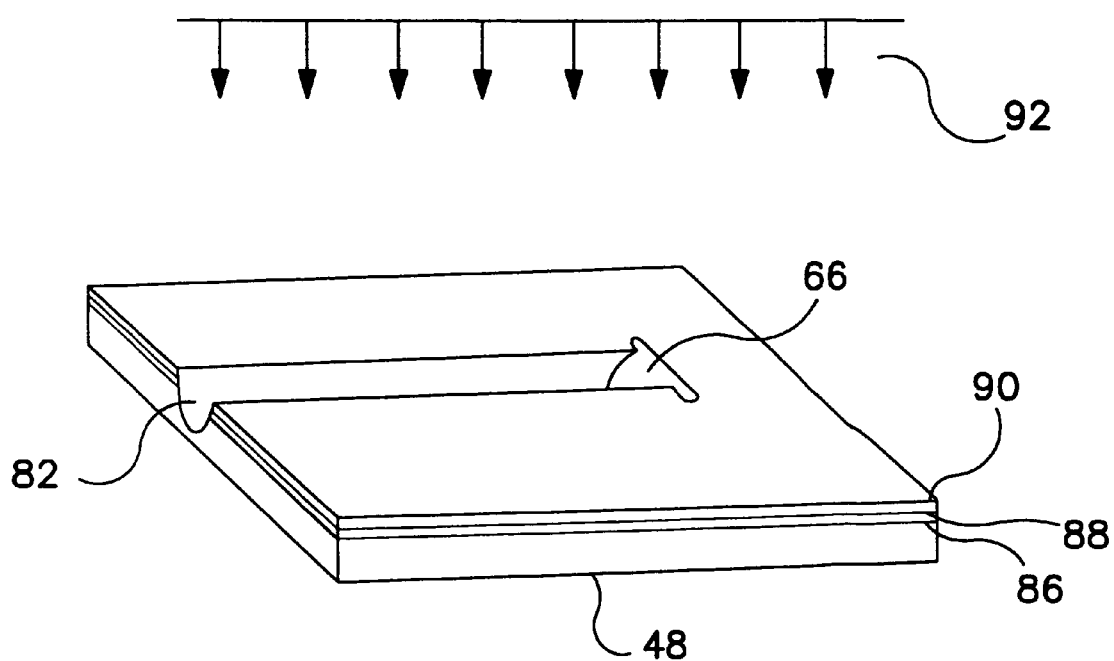
FIG. 5n is an illustration of the substrate wafer metallization process in accordance with the present invention.

More specifically, and with reference to the drawings, the first steps of the alignment device fabrication, as illustrated in FIG. 4, and FIGS. 5a through 5n, relate to the formation of a groove and a reflective mirror from semiconductor material by standard photolithography processes. The construction of the alignment device is accomplished by exploiting the anisotropic etch characteristics of III-V semiconductors. The unique crystal plane properties, as illustrated in FIG. 4, of III-V semiconductor material allow for the preferential etching of reflective surfaces in one (111) crystal plane 47 of a substrate, etching a lens on a (001) crystal plane 34 of the substrate wafer, and etching an intersecting groove on an (100) crystal plane 35 of the substrate wafer.

The first step of the alignment device fabrication process involves lapping the entire first surface 54 of an indium phosphide (InP) substrate wafer 48 and polishing the entire first surface 54 to a thickness of from approximately 135 to 175 microns, as illustrated in FIGS. 5a and 5b. The lapping and polishing steps are performed to provide the substrate wafer 48 with a desired thickness and are performed while the substrate wafer 48 is secured using wax 52 on a carrier S0.

Following the lapping and polishing steps are the reflective mirror fabrication steps. The first step of the reflective mirror fabrication process, as illustrated in FIG. 5c, is coating a layer of photoresist material 56 over the entire first surface 54 of the indium phosphide (InP) substrate wafer 48. The preferred photoresist material 56 is 2-ethoxpyethylacetate (60%) and n-butyl acetate (5%) in xylene and hexamethyldisilozane (HDMS), and is preferred for its suitability for use with a variety of etching techniques. The indium phosphide substrate wafer 48 is chosen for its etching characteristics and its ability to form a high refractive lens index with few aberrations. It is important to note that other materials can be used for the substrate wafer 48 and the photoresist coating 56. For example, the substrate wafer 48 may be any III-V semiconductor material and may include gallium arsenide (GaAs), indium arsenide (InAs), and gallium phosphide (GaP). The photoresist coating material 56 may include 2-ethoxyethylacetate+n-butyl acetate in xylene solvent, 2-ethoxyethylacetate+n-butyl acetate in xylene and silicon dioxide ($SiO_2$), 2-ethoxyethylacetate+n-butyl acetate in xylene and silicon nitride ($Si_3N_4$), silicon dioxide ($SiO_2$) and complex silicon nitride ($Si_xN_y$), or aluminum oxide ($Al_2O_3$).

After coating the layer of photoresist material 56 over the first surface 54 of the substrate wafer 48, the substrate wafer 48 is soft baked at a temperature of from approximately 100° C. to 150° C. and for a period of approximately 45 minutes to remove any solvent from the photoresist material 56.

Next, as illustrated in FIG. 5d, a mask 58 is used to transfer a reflective mirror pattern 60 from the mask 58 to the substrate wafer 48. The mask 58 is aligned to the substrate wafer 48 along the (111) crystal plane and the layer of photoresist material 56 is exposed to an ultra violet UV light source 62 through the mask 58 to transfer the reflective mirror pattern 60 to the substrate wafer 48. Next, as illustrated in FIG. 5e, the layer of photoresist material 56 of FIG. 5d is developed to form a photoresist mask 64 on the first surface 54 of the substrate wafer 48 and the photoresist mask 64 is rebaked at approximately 150° C. for approximately one hour. The development of photoresist material is a standard step in photolithography processing.

Following the previously mentioned photolithography steps, the substrate wafer 48 is preferentially etched in the areas not protected by the photoresist mask 64, as illustrated in FIGS. 5f and 5g, to form a flat reflective mirror 66. This preferential etching step is done by a wet-chemical etch process where the substrate 48 is etched in an orthogonal direction on the (111) crystal plane 47 illustrated in FIG. 4. The unique crystal plane properties of III-V semiconductor material allows for the preferential etching of flat angled reflective surfaces of between 36 and 53 degrees, as illustrated in the preferred embodiment. For the purposes of the preferred embodiment, the surface 54 of the substrate wafer 48 shown in FIG. 5f is wet-chemically etched in a deionized water:potassium dichromate:acetic acid:hydrobromic acid ($H_2O:K_2Cr_2O_7:H_3CCOOH:HBr$), 450 ml:66 g: 100 ml:300 ml solution at a temperature below zero degree C. Alternative wet-chemical etch solutions may include bromine:methanol ($Br_2:H_3COH$), bromine:isopropanol ($Br_2:H_5C_2OH$), deionized water:hydrobromic acid:acetic acid ($H_2O:HBr:H_3CCOOH$), deionized water:potassium dichromate:sulfuric acid:hydrochloric acid ($H_2O:K_2Cr_2O_7:H_2SO_4:HCl$), phosphoric acid:hydrochloric acid ($H_3PO_4:HCl$), phosphoric acid:hydrochloric acid::deionized water ($H_3PO_4:HCl:H_2O$), phosphoric acid:hydrochloric acid:hydrogen peroxide ($H_3PO_4:HCl:H_2O_2$), iron chloride:hydrochloric acid ($FeCl_3:HCl$) under illumination, potassium periodide:hydrochloric acid ($KIO_3:HCl$), hydrochloric acid:acetic acid:hydrogen peroxide ($HCl:acetic\ acid:H_2O_2$), hydrochloric acid:hydrogen peroxide:deionized water ($HCl:H_2O_2:H_2O$), sulfuric acid:hydrogen peroxide:deionized water ($H_2SO_4:H_2O_2:H_2O$), citric acid:hydrogen peroxide:deionized water (citric acid:$H_2O_2:H_2O$), bromine:methanol ($Br_2:CH_3OH$), nitric acid:hydrofloric acid::deionized water ($HNO_3:HF:H_2O$), or hydrogen peroxide:amonium hydroxide:deionized water ($H_2O_2:NH_4OH:H_2O$).

Following the etching of the surface 54 of the substrate wafer 48 to form the flat reflective mirror 66, the photoresist mask 64 is removed from the surface 54 of the substrate wafer 48, as illustrated in FIG. 5h. The surface 54 is cleaned using acetone. Next, the acetone is removed from the surface 54 of the substrate wafer 48 with isopropanol and the isopropanol is removed using deionized water. Finally, oxides are removed from the surface 54 using potassium hydroxide (KOH) and etch residue is removed from the surface 54 using a solution of sulfuric acid:hydrogen perodixe:deionized water ($H_2SO_4:H_2O_2:H_2O$).

As previously mentioned, the monolithic integration of a reflective surface and a groove is significant. Monolithic integration allows for more reliable and less complex optical alignment between optical devices. To further the monolithic integration of the optical alignment device, a groove is formed on the surface of the substrate wafer where the reflective mirror has been formed.

The first steps in the fabrication of the groove are photolithography steps, as shown in FIG. 5i. The first step includes coating a layer of photoresist material 72 on the surface 54 of the substrate wafer 48 where the flat reflective mirror 66 has previously been formed. The preferred photoresist material 72 is 2-ethoxyethylacetate+n-butyl acetate in xylene. Next, the substrate wafer 48 is soft baked at a temperature of from approximately 100° C. to 150° C. for a period of approximately 45 minutes to remove solvents from the photoresist material 72.

As further illustrated in FIG. 5j, a mask 74 is used to transfer a groove pattern 76 to the substrate wafer 48. Next, the mask 74 is selectively aligned to the substrate wafer 48 along the (100) crystal plane. Using standard photolithography steps, the layer of photoresist material 72 is exposed with an ultra-violet light source 78 through the mask 74.

The layer of photoresist material 72 is developed creating a photoresist mask 80 on the surface 54 of the substrate wafer 48 and the photoresist mask 80 is rebaked at approximately 150° C. for approximately one hour, as shown in FIG. 5k. The surface 54 of the substrate wafer 48 containing the photoresist mask 80 is wet-chemically etched in the areas not protected by the photoresist mask 80 to form the groove 82, as shown in FIGS. 5l and 5m. The groove 82 is etched on the (100) crystal plane 35, shown in FIG. 4, of the substrate wafer 48 in an orthogonal direction such that the end 84 of the groove 82 intersects the plane of the flat reflective mirror 66. Because of the anisotropic etch characteristics of the substrate wafer 48, the groove 82 is formed in a semi-circular shape, as shown in FIG. 5l. The semi-circular shape of the groove 82 allows for increased stability during thermal expansion of the microbench system because the semi-circular groove 82 allows more surface area contact with round optical fibers than equivalent v-groove structures.

Following the formation of the groove 82, the photoresist mask 80 is removed from the surface 54 of the substrate wafer 48 and the surface 54 of the substrate wafer 48 is cleaned, using the same steps described in the formation of the flat reflective mirror.

Figure 6A:
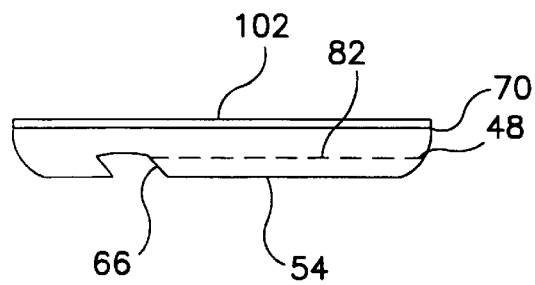
FIG. 6a is a side view illustration of the substrate coated with a layer of photoresist material to begin the formation of a lens through photolithography steps in accordance with the present invention.

In order to complete the monolithic integration of the optical alignment device, a micro-optical lens is formed on the substrate wafer 48 opposite the surface 54 where the groove 82 and flat reflective mirror 66 have been formed. More specifically and with reference to the drawings, the first steps of the micro-optical lens fabrication, as illustrated in FIGS. 6a through 6f, relate to the formation of a micro-optical lens by photolithography processes. The first step of the lens fabrication process, as illustrated in FIG. 6a, is coating a layer of photoresist material 102 over an entire surface 70 of the substrate wafer 48. The preferred photoresist material 102 is 2-ethoxpyethylacetate (60%) and n-butyl acetate (5%) in xylene and hexamethyldisilozane (HDMS). The indium phosphide substrate wafer 48 is chosen for its etching characteristics and its ability to form a high refractive index lens with low aberrations. As mentioned in previous photolithography steps, the photoresist coating material 102 may include 2-ethoxyethylacetate+n-butyl acetate in xylene solvent, 2-ethoxyethylacetate+n-butyl acetate in xylene and silicon dioxide ($SiO_2$) precoated, 2-ethoxyethylacetate+n-butyl acetate in xylene and silicon nitride ($Si_3N_4$) precoated, silicon dioxide ($SiO_2$) and complex silicon nitride ($Si_xN_y$), or aluminum oxide ($Al_2O_3$) precoated.

After coating the layer of photoresist material 102 over the surface 70 of the substrate wafer 48, the substrate wafer 48 is soft baked at a temperature of from approximately 100° C. to 150° C. and for a period of approximately 45 minutes to remove any solvent from the photoresist material 102.

Figure 6E:
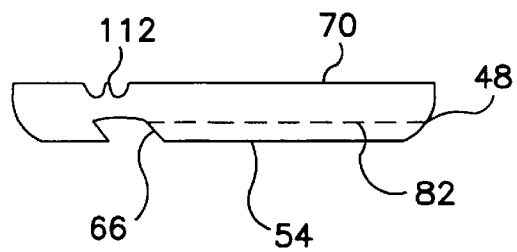
FIG. 6e is a cross-sectional side view illustration of the substrate wafer of FIG. 6d where the photoresist has been removed from the surface of the substrate.
Figure 6B:
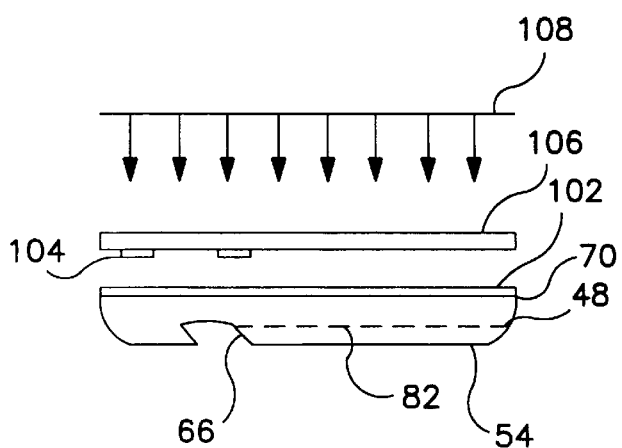
FIG. 6b is a side view illustration of the substrate wafer which includes a layer of photoresist material on a surface of the substrate wafer and the layer of photoresist material is exposed by an ultra-violet light source through a mask to later form a lens in accordance with the present invention.

Next, as illustrated in FIG. 6b, a mask 106 is used to transfer a lens pattern 104 from the mask 106 to the substrate wafer 48. Lens patterns are chosen based on the type of lens required for a particular optical application. For the purposes of the preferred embodiment a semi-spherical lens is chosen. The type of lens formed on a semiconductor substrate wafer can be aspherical, semi-cylindrical, gausian-cylindrical, binary, Fresnell, refractive, or diffractive as dictated by the mask pattern.

Figure 6F:
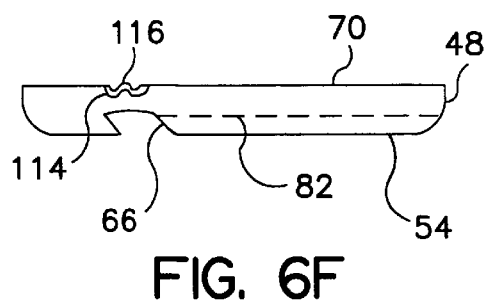
FIG. 6f is a side view illustration of the substrate wafer where the lens has been polished and coated with antireflectivity coating in accordance with the present invention.
Figure 6C:
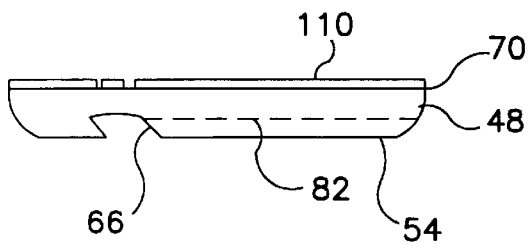
FIG. 6c is a side view illustration of the substrate wafer and a photoresist mask formed on the surface of the substrate wafer after the exposure of the substrate wafer to the ultra-violet light source and photolithographic development in accordance with the present invention.

As shown in FIG. 6b, the mask 106 is aligned to the substrate wafer 48 so that the lens formed by subsequent etching steps and the reflective mirror 66 are optically aligned. The mask 106 is aligned along a (110) crystal plane 33 (see FIG. 4) of the substrate wafer 48 using an infra-red camera. Next, the layer of photoresist material 102 is then exposed to an ultra violet UV light source 108 through the mask 106 to transfer the lens pattern 104 to the substrate wafer 48. As illustrated in FIG. 6c, the layer of photoresist material 102 of FIG. 6a is developed to form a photoresist mask 110 on the surface 70 of the substrate wafer 48 and the photoresist mask 110 is rebaked at approximately 150° C. for approximately one hour. The development of photoresist material is a standard step in photolithography processing.

Figure 6D:
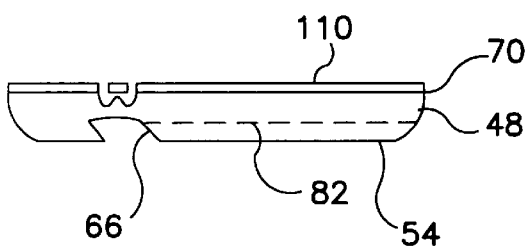
FIG. 6d is a cross-sectional side view illustration of the preferentially etched surface of the substrate wafer where a lens is formed in accordance with the present invention.

Following the previously mentioned photolithography steps, the substrate wafer 48 is non-selectively etched in the areas surrounding the photoresist mask 110, as illustrated in FIG. 6d. For substrate wafers precoated with oxide or nitride photoresist, the oxide or nitride must be removed before the non-selective etching is performed. The non-selective etching step is done to begin the formation of a lens and can be accomplished by a wet-chemical etch process on the (001) crystal plane 34 (see FIG. 4) of the substrate wafer 48. For the purposes of the preferred embodiment, the surface 70 of the substrate wafer 48 shown in FIG. 6d is wet-chemically etched in a deionized water:potassium dichromate:acetic acid:hydrobromic acid ($H_2O:K_2Cr_2O_7:H_3CCOOH:HBr$), 450 ml:66 g: 100 ml:300 ml solution at a temperature of from 40° C. to 60° C. Depending on the substrate material used, alternative wet-chemical etch solutions can include bromine:methanol ($Br_2:H_3COH$), bromine:isopropanol ($Br_2:H_5C_2OH$), deionized water:hydrobromic acid:acetic acid ($H_2O:HBr:H_3CCOOH$), deionized water:potassium dichromate:sulfuric acid:hydrochloric acid ($H_2O:K_2Cr_2O_7:H_2SO_4:HCl$), phosphoric acid:hydrochloric acid ($H_3PO_4:HCl$), phosphoric acid:hydrochloric acid:deionized water ($H_3PO_4:HCl:H_2O$), phosphoric acid:hydrochloric acid:hydrogen peroxide ($H_3PO_4:HCl:H_2O_2$), iron chloride:hydrochloric acid ($FeCl_3:HCl$) under illumination, potassium periodide:hydrochloric acid ($KIO_3:HCl$), hydrochloric acid:acetic acid:hydrogen peroxide ($HCl:acetic acid:H_2O_2$), hydrochloric acid:hydrogen peroxide:deionized water ($HCl:H_2O_2:H_2O$), sulfuric acid:hydrogen peroxide:deionized water ($H_2SO_4:H_2O_2:H_2O$), citric acid:hydrogen peroxide:deionized water (citric acid:$H_2O_2:H_2O$), bromine:methanol ($Br_2:CH_3OH$), nitric acid:hydrofluoric acid:deionized water ($HNO_3:HF:H_2O$), or hydrogen peroxide:amonium hydroxide:deionized water ($H_2O_2:NH_4OH:H_2O$).

Following the etching of the surface 70 of the substrate wafer 48 in the areas surrounding the photoresist mask 110, the photoresist mask 110 is removed from the surface 70 of the substrate wafer 48, as illustrated in FIG. 6e. The surface 70 of the substrate wafer 48 is cleaned using acetone. Next, the acetone is removed from the surface 70 of the substrate wafer 48 with isopropanol and the isopropanol is removed using deionized water. The photoresist can also be removed using photoresist stripper, potassium hydroxide, or other equivalent alkaline chemicals followed by a deionized water rinse. Finally, oxides are removed from the surface 70 using potassium hydroxide (KOH) and etch residue is removed from the surface 70 using a solution of sulfuric acid:hydrogen perodixe:deionized water ($H_2SO_4:H_2O_2:H_2O$).

Next, the lens is polished by etching the entire surface 70 of the substrate wafer 48, where an etched peak 112 on the surface 70 of the substrate wafer 48 has been formed. The same wet-chemical etching solution described in FIG. 6d is used here to polish the lens by smoothing the surface of the etched peak 112. Etching the entire surface 70 of the substrate wafer 48 to polish the lens requires that the etching be done at a lower temperature, preferably 30° C. to 40° C. The result of this low temperature etch, as illustrated in FIG. 6f, is a lens 114 formed on the surface 70 of the substrate wafer 48.

The lens 114 is coated with antireflectivity coating 116 using an electron beam (e-beam) evaporation process. Although the illustrated embodiment uses an e-beam evaporation process to apply the antireflectivity coating, alternative processes like sputtering or chemical vapor deposition (CVD) can also be used. For the purposes of the illustrated embodiment, a crystal mixture of antireflectivity (AR) coating which contains magnesium flouride (MgF), aluminum oxide ($Al_2O_3$), hafnium flouride (HfF), silicon dioxide ($SiO_2$), and silicon nitride ($Si_3N_4$) is deposited over the entire surface 70 of the substrate wafer 48 containing the lens 114.

To secure the microbench system to a micro-optical device, the entire substrate 48 is metallized, except in the area of the lens 66, by first evaporating 92 a layer 86 of titanium (Ti) over the substrate wafer 48, evaporating 92 a layer of platinum (Pt) 88 over the layer 86 of titanium, evaporating 92 a layer 90 of gold (Au) over the layer 88 of platinum, and applying a standard alloy treatment to the metal layers to bond the layers for better adhesion, as illustrated in FIG. 5n.

Figure 7:
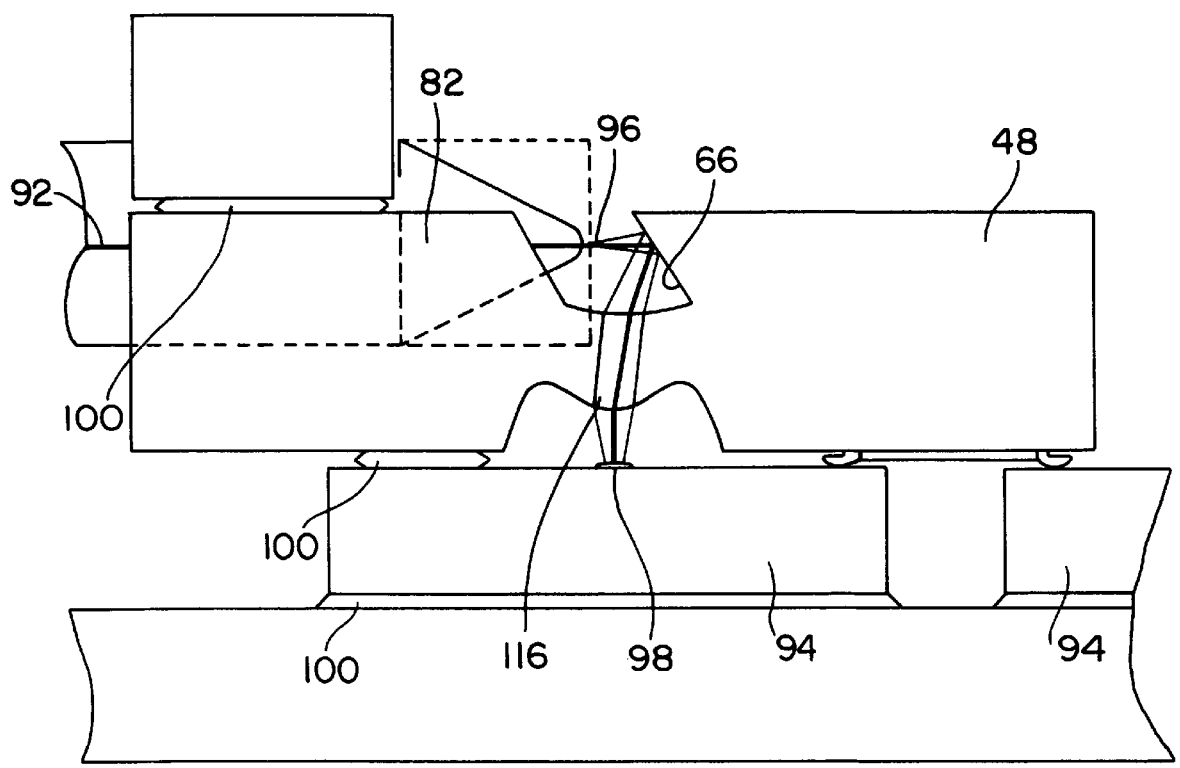
FIG. 7 is an illustration of the alignment device in accordance with the present invention.

Finally, as shown in FIG. 7, an optical fiber 92 and the substrate wafer 48 are secured using eutectic bonds 100. The optical fiber 92 is secured in the groove 82 and the substrate wafer 48 is mounted to optical devices 94. An optical signal 96 is emitted from the optical fiber 92 and is reflected at the flat reflective mirror 66 and focused through the lens 116 to a target area 98.

Obviously, many modifications and variations of the present invention are possible in light of the above teachings. Thus, it is to be understood that, within the scope of the appended claims, the invention may be practiced otherwise than as specifically described above.

What is claimed is:

1. An alignment device for the coupling of light between optical devices, comprising:

a III-V semiconductor substrate wafer having a first crystal plane, a second crystal plane, a third crystal plane and a groove etched on the third crystal plane on a side of the substrate wafer and intersecting the first crystal plane;

a mirror etched on the first crystal plane of the substrate wafer; and a lens etched on the second crystal plane of the substrate wafer.

2. An alignment device as recited in claim 1, wherein the substrate comprises a III-V semiconductor material selected from the group consisting of gallium arsenide (GaAs), gallium phosphide (GaP), indium phosphide (InP), or indium arsenide (InAs).

3. An alignment device as recited in claim 1, wherein the first crystal plane is a (111) plane.

4. An alignment device as recited in claim 1, wherein the second crystal plane is a (001) plane.

5. An alignment device as recited in claim 1, wherein the third crystal plane is a (100) plane.

6. An alignment device as recited in claim 1, wherein the mirror has a flat reflective surface.

7. An alignment device as recited in claim 6, wherein the flat reflective surface of the mirror has a natural crystal plane angle of approximately 36 to 53 degrees.

8. An alignment device as recited in claim 1, wherein the lens comprises a shape selected from the group consisting of semi-spherical, aspherical, semi-cylindrical, refractive, diffractive, Fresnell, binary, or gausian-cylindrical.

9. An alignment device as recited in claim 1, wherein at least one of the optical devices is a waveguide.

10. An alignment device as recited in claim 1, wherein at least one of the optical devices is a modulator.

11. An alignment device as recited in claim 1, wherein at least one of the optical devices is a photodetector.

12. An alignment device as recited in claim 1, wherein at least one of the optical devices is an optical fiber.

13. An alignment device as recited in claim 12, wherein the groove provides a channel for positioning the optical fiber therein.

* * * * *